(12) United States Patent
Kuo et al.

(10) Patent No.: US 9,233,308 B2
(45) Date of Patent: Jan. 12, 2016

(54) SYSTEM AND METHOD FOR DELIVERING MEDIA OVER NETWORK

(71) Applicant: Ubitus Inc., Road Town, Tortola (VG)

(72) Inventors: Jung Chang Kuo, Taipei (TW); Wen-Kae Tsao, Taipei (TW)

(73) Assignee: Ubitus Inc. (VG)

( * ) Notice: Subject to any disclaimer, the term of this patent is extended or adjusted under 35 U.S.C. 154(b) by 0 days.

(21) Appl. No.: 14/475,830

(22) Filed: Sep. 3, 2014

(65) Prior Publication Data

US 2015/0182857 A1    Jul. 2, 2015

Related U.S. Application Data

(63) Continuation-in-part of application No. 14/146,343, filed on Jan. 2, 2014, now Pat. No. 8,860,720.

(51) Int. Cl.
| | |
|---|---|
| *G06T 17/00* | (2006.01) |
| *A63F 13/25* | (2014.01) |
| *H04N 21/426* | (2011.01) |
| *H04N 21/234* | (2011.01) |
| *H04N 21/233* | (2011.01) |
| *H04N 21/439* | (2011.01) |
| *H04N 21/44* | (2011.01) |
| *H04N 21/81* | (2011.01) |
| *G06T 17/10* | (2006.01) |
| *H04S 5/00* | (2006.01) |
| *A63F 13/33* | (2014.01) |
| *A63F 13/32* | (2014.01) |
| *H04L 29/08* | (2006.01) |
| *A63F 13/355* | (2014.01) |

(52) U.S. Cl.
CPC .................. *A63F 13/25* (2014.09); *A63F 13/32* (2014.09); *A63F 13/33* (2014.09); *A63F 13/355* (2014.09); *G06T 17/10* (2013.01); *H04L 67/26* (2013.01); *H04N 21/233* (2013.01); *H04N 21/234* (2013.01); *H04N 21/42653* (2013.01); *H04N 21/439* (2013.01); *H04N 21/44* (2013.01); *H04N 21/8106* (2013.01); *H04N 21/8146* (2013.01); *H04S 5/005* (2013.01); *A63F 2300/66* (2013.01)

(58) Field of Classification Search
None
See application file for complete search history.

(56) References Cited

U.S. PATENT DOCUMENTS

| | | | | |
|---|---|---|---|---|
| 6,384,821 B1 * | 5/2002 | Borrel | ...................... | G06T 15/00 345/421 |
| 8,824,861 B2 * | 9/2014 | Gentile | ...................... | G06T 5/50 386/278 |

* cited by examiner

*Primary Examiner* — Peter Hoang

(57) ABSTRACT

A method for delivering media from a server to a client device over a network is disclosed. An application running on the server generates a virtual 3D environment containing 3D models and sounds. The server checks the status of each 3D model or sound in a predetermined order, and then, only those 3D models and sounds which are not pre-stored in the client device will all be rendered by the server into a frame of 2D video stream with sound. The server then sends to the client device the frame and meta data of the 3D models and sounds which are pre-stored in the client device via the network. The client device uses the frame as a background for rendering the 3D models and sounds which are pre-stored in the client device so as to generate a mixed frame of video stream with sound for output.

20 Claims, 16 Drawing Sheets

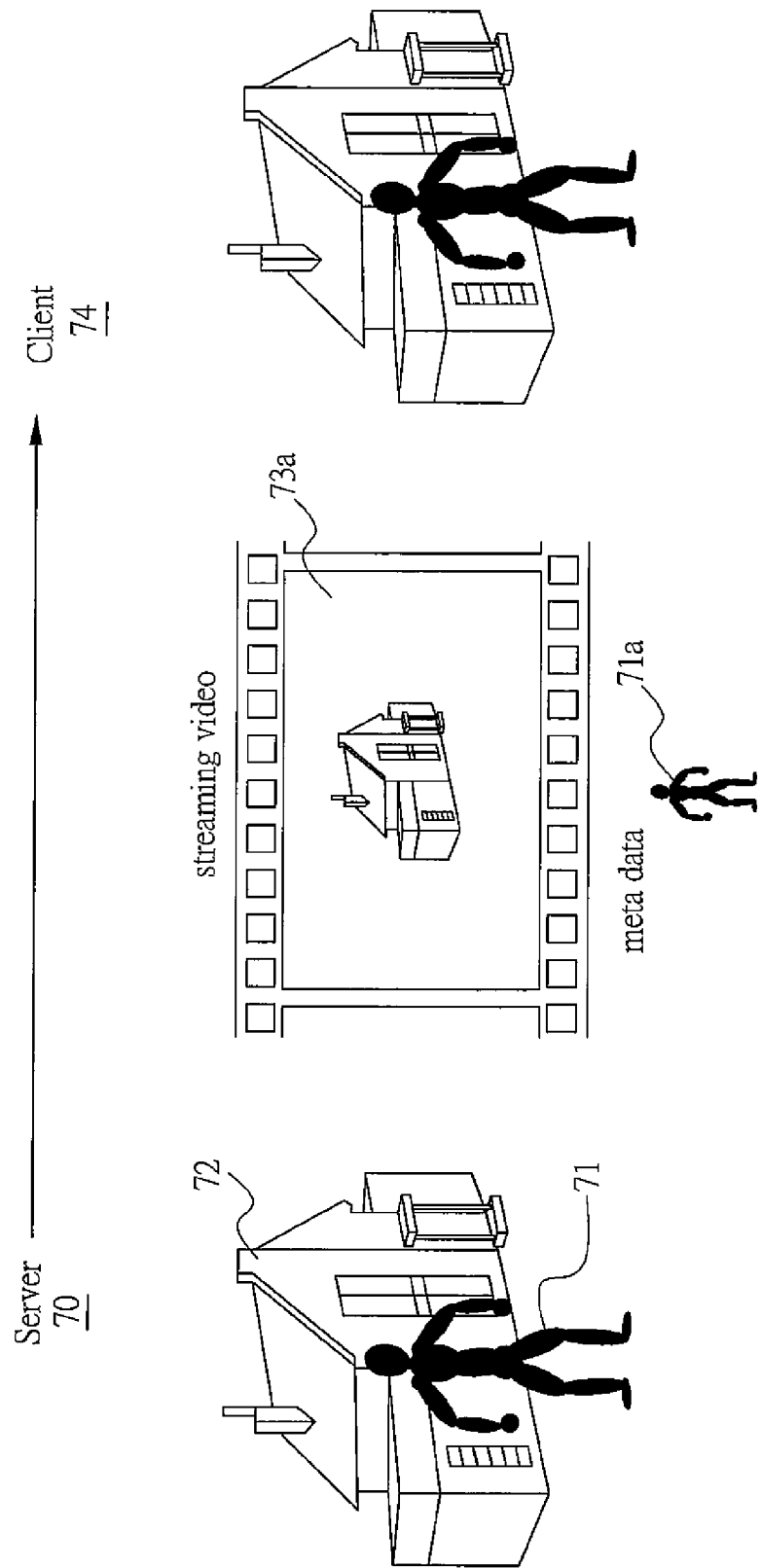

SYSTEM AND METHOD FOR DELIVERING MEDIA OVER NETWORK

RELATED CASES

This is a continuation-in-part of co-pending Ser. No. 14/146,343, filed on Jan. 2, 2014, whose disclosures are incorporated by this reference as though fully set forth herein.

BACKGROUND OF INVENTION

1. Field of the Invention

The invention relates to a system and a method for delivering media such like graphics and sounds over a network, especially relates to a method which provides renderings of 3D objects and sounds for 3D applications by combining 3D renderings and 3D sounds on client device with a 2D video with stereo sound of scene provided by a server.

2. Description of the Prior Art

During the past years, online games have become more and more popular all over the world. With the development of cloud computing related systems and technologies, a technology for allowing a server to stream the game contents to provide services has been introduced.

A conventional way to provide such cloud-based online game service is to let the server do almost all of the calculations. Which means, when providing the online game service, the server has to generate a virtual 3D environment containing multiple 3D objects including which can be controlled or moved by players. In some prior arts, these 3D objects might also contain sound effects. And then, based on the controlling result of the player, the server renders the virtual 3D environment together with the 3D objects into a 2D game screen with stereo sound to be shown and played on the payer's device. And then, the server transmits the rendered image together with the stereo sound to the player's device as a 2D video stream containing sounds. The player's device then only needs to "play" the 2D video stream, without the need to do the calculations of the 3D rendering. However, such conventional technology performs the rendering on a large number of players in the server, which results in increasing the load of the server for performing the 3D rendering processing. In addition, since the results of game plays are all transmitted in the form of 2D video stream containing sounds, not only the quality of graphical and audio result is not good enough to present 3D objects, but also the consumption of communication bandwidth between the server and the player's device is considerable as well.

SUMMARY OF THE INVENTION

Accordingly, it is the primary object of the present invention to provide a system and a method for delivering media (such as graphics and sounds) over a network, which can decrease the load of the server, enrich the graphical and audio result displayed and played on the client device, and save the communication bandwidth between the server and the client device. Especially, the method of the present invention provides renderings of 3D objects and sounds for 3D applications by combining 3D renderings and 3D sounds on client device with a 2D scene video (including stereo sounds) provided by a server.

In order to achieve aforementioned object, the present invention provides a method and a system for delivering graphics over a network. The system comprises: a server and a client device. The method of the invention comprises the following steps.

Step (A): running an application on the server to generate a virtual 3D environment containing a plurality of 3D models and 3D sounds. Each of the 3D models or 3D sounds being associated with a status for indicating whether or not the 3D model or 3D sound is pre-stored in a client device. The client device connects to the server via a network in order to retrieve media containing at least some of the 3D models and 3D sounds generated by the application.

Step (B): as for 3D models, the server checking the statuses of the 3D models in order to decide which 3D models are to be encoded as a video frame of a 2D video stream in such a manner that, those 3D models which are not pre-stored in the client device will all be encoded into the video frame.

As for 3D sounds, the server checking the status of the 3D sounds in order to decide which 3D sounds are to be encoded as stereo sound with 2D video stream in such a manner that, those 3D sounds which are not pre-stored in the client device will all be encoded into the video frame; wherein, when a 3D sound is encoded as stereo sound in the video frame, its volumes on left and right channels are decided by its position and velocity relative to user's ears; wherein, background music may be treated as a 3D sound with a predefined 3D position.

To reduce server loading or avoid sound noise generated by unstable network data transfer, server may give up encoding these 3D sounds in video frames. In this case, 3D sound is only played on client device when it is pre-stored in a client device.

Step (C): the server sending at least the video frame of the 2D video stream with stereo sound to the client device via the network.

Step (D): the client device decoding the video frame with stereo sound received from the server and using said video frame as a background for rendering the 3D models and 3D sounds which are pre-stored in the client device but not included within the video frame, so as to generate a mixed video frame.

Step (E): the client device outputting the mixed video frame as a video frame of an output video stream with sound.

In a preferred embodiment, in Step (B), the statuses of the 3D models are checked by the server in an order from the one nearest to a virtual position toward another one farthest to the virtual position; during the check by following said order, when a 3D model is first found to be not pre-stored in the client device, then all 3D models beyond that found 3D model will also be encoded into the frame, no matter those 3D models are pre-stored in the client device or not. When position of any 3D model is changed, or when the virtual position for sorting is changed, the above checking is performed again, and whether a 3D model is encoded in the video frame depends on newest checking result.

In a preferred embodiment, when a new 3D model appears in the 3D environment, then all 3D models beyond that new 3D model will be encoded into the frame, no matter those 3D models are pre-stored in the client device or not.

In a preferred embodiment, in Step (C), the server also sends the 3D models or 3D sounds that are not pre-stored in the client device to the client device in a predetermined order; when the client device receives the 3D model or 3D sound sent by the server, the client device stores the 3D model or 3D sound and then sends a message to the server in order to change the status of the 3D model or 3D sound for indicating the 3D model or 3D sound is now pre-stored in the client device.

In a preferred embodiment, in Step (C), the server also sends a status information of 3D models and 3D sounds that are not encoded into the video frame to the client device; the client device receives and checks the status information in such a manner that, if any 3D model or 3D sound contained in the status information is not pre-stored in the device receive, then the client sends a request to the server in order to download that 3D model or 3D sound.

In a preferred embodiment, the status information includes meta data of each 3D model or 3D sound that is not encoded into the video frame, said meta data include a name, a position, a velocity and an attribute of each 3D model or 3D sound.

In a preferred embodiment, the server further comprises: a 3D Scene Transmitter and a 3D Scene Server. The 3D Scene Transmitter is a library either compiled within the application or dynamically linked in runtime with the application. The 3D Scene Transmitter keeps a list of all 3D models and 3D sounds, and the status of each 3D model or 3D sound. The status is used to indicate the 3D model or 3D sound being in one of the following status: "Not Ready", "Loading" and "Ready for Client". The 3D Scene Server is a server program running on server with the application. The 3D Scene Server acts as a hub of message transfer between the 3D Scene Transmitter and the client device. The 3D Scene Server also acts as a file download server for the client device to download necessary 3D models and 3D sounds from the server.

In a preferred embodiment, the client device further comprises: a 3D Scene Client and a 3D Scene Cache. The 3D Scene Client is a program running on the client device for producing the output video stream and for communicating with the server via the network. The 3D Scene Cache is for storing at least the 3D models and 3D sounds previously downloaded from the server.

BRIEF DESCRIPTION OF THE DRAWINGS

The present invention will now be specified with reference to its preferred embodiment illustrated in the drawings, in which:

FIGS. 4A, 4B and 4C schematically show an example how the video streaming and 3D models are transmitted in accordance with the method of the present invention;

DESCRIPTION OF THE PREFERRED EMBODIMENT

Figure 1:
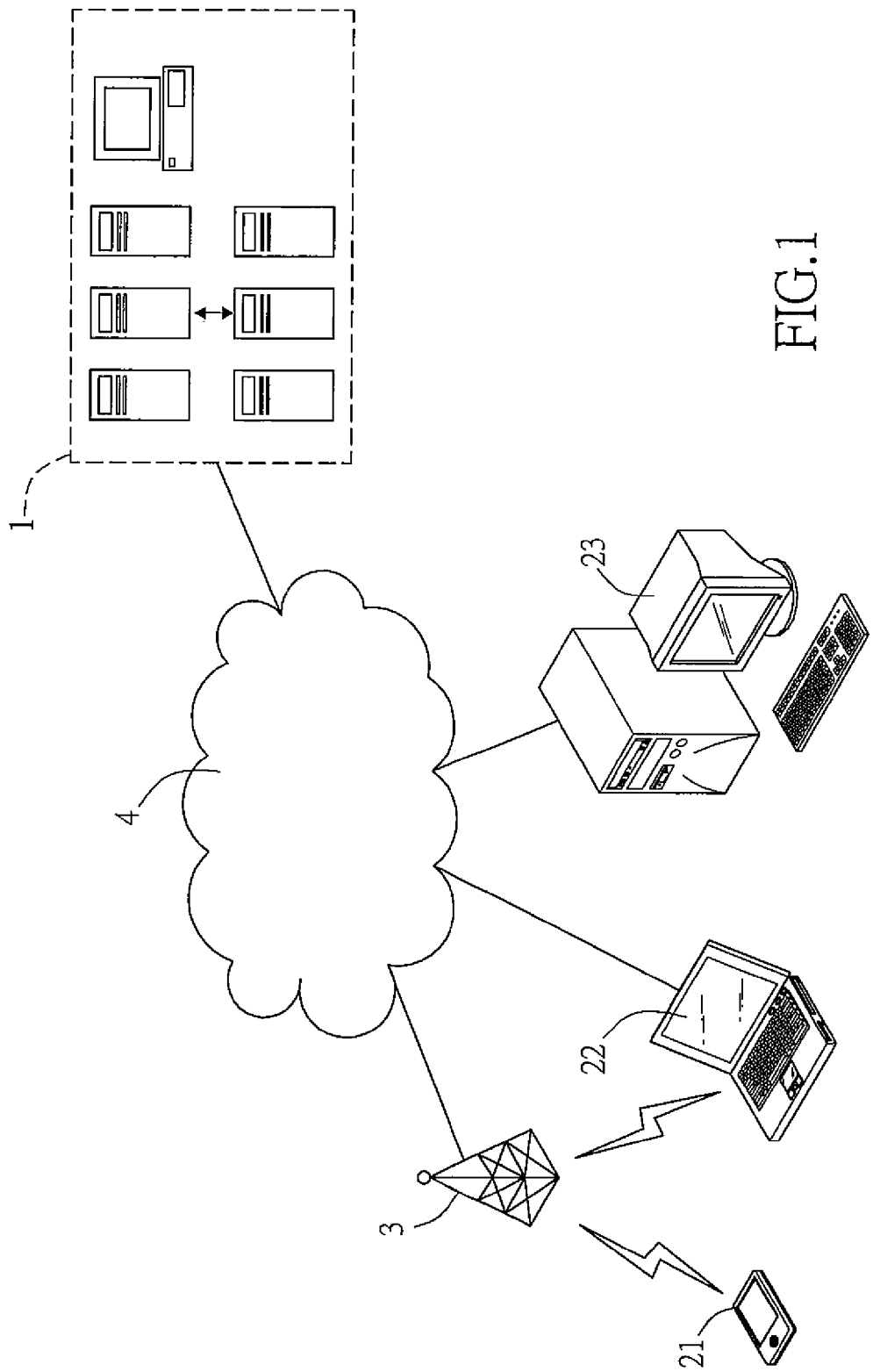
FIG. 1 illustrates a typical embodiment of a system for delivering media over a network in accordance with the present invention.

One use of the present invention is in online games, where a player uses a client device to play a game on a server over a network. The server is responsive to commands by the user and generates video for the client's device. Thus, for example, a user makes a move on the client device. The move is transmitted to the server device, which then recalculates an image that is transmitted back to the client's display. In many games, the server generates the 2D images which include the 3D rendering of objects within the field of view.

The present invention parses 3D rendering of objects within the field of view between the server and client device by having the server provides the client device with 3D models and 3D sounds as needed. Thus for example, the server provides some or all of the 3D models and 3D sounds to the client device, along with meta data, such as the position, orientation and status information, for each 3D model or 3D sound.

As an example, early in the play of a game, all graphics for displaying on the client device, including 3D rendering, are generated by the server and provided as 2D video streaming with stereo sound over the network. The system of the present invention pushes media and rendering information for 3D models and 3D sounds within the field of view over the network to the client device, preferably with near-field objects having priority. The system of the present invention has the client device rendering 3D models and 3D sounds when possible, and otherwise has the server rendering the objects which includes 3D model or 3D sound.

Once a 3D model or a 3D sound is resident on the client device, the server then needs to only provide meta data for that object (either 3D model or 3D sound) to the client device. The client device can then render those objects and superimpose them on any 2D video with stereo sound provided by the server. The server will then not need to render the 3D models and 3D sounds unless requested by the client device. This method will save GPU cycles and CPU calculations on the server. The server can keep a running DB of 3D models and 3D sounds for increasing performance in client communication.

The client device's display thus contains a combination of: (a) a 2D video stream of a 3D rendered scene with stereo sound as rendered on server with (b) 3D models and 3D sounds downloaded from the server, and stored locally on the client device, and rendered on the client device. This mixing of a 2D video stream with stereo sound with locally rendered 3D models and 3D sounds will create a graphically rich 3D scene and surrounding audio effect while reducing bandwidth consumption.

In one embodiment, a 2D video stream with stereo sound is sent to the client device along with the meta-data about the 3D models and 3D sounds. The client device checks to see if it has the 3D models and 3D sounds stored locally, if not, it will request the 3D models and 3D sounds from the server. The client device will locally store the 3D models and 3D sounds, building up a library of 3D models and 3D sounds to use when reconstructing a scene locally. In this way, over time, the bandwidth consumption will be little more then what is needed for a video stream but the local result will be graphically rich.

The meta data will allow the client device to correctly mix the locally rendered 3D models and 3D sounds with the 2D video stream with stereo sound without missing or duplicating any 3D models or 3D sounds. As stated, when client device locally has stored all necessary 3D models and 3D sounds, it can reproduce the whole 3D scene and sounds, the server no longer needs to render anything, until a new 3D model or 3D sound not available on client device is added into 3D scene and sounds. If it is a new 3D model, server will render this new 3D model and all objects (including 3D models and sounds) behind it until it is locally available on the client device; in addition, if it is a new 3D sound, server will only render this 3D sound until it is locally available on the client device.

Client device will cache the 3D models and 3D sounds on the client device's local storage device if possible, to avoid downloading this information again in future execution, so network bandwidth cost can be further reduced. If local storage is not available the request and render process will operate in real time.

FIG. 1 illustrates a typical embodiment of a system for delivering media over a network in accordance with the present invention. A server 1 is applied for providing the service of an application executed on the server 1, such service can be, but not limited to, a cloud-based online game service. A plurality of client devices 21, 22, 23 can connect (log in) to the server 1 via a network 4 to use the service provided by the application running on the server 1. In this embodiment, the network 4 is Internet, and the client devices 21, 22, 23 can be any electronic device having the ability to access the Internet, such like (but not limited to) a smart phone 21, a digital plate, a notebook 22, a desktop computer 23, a video game player, or even a smart TV. Some of the client devices 21, 22 are connected wirelessly to the network 4 by means of a mobile station, some others can be connected to the network 4 through a router in a wired manner. The application running on the server 1 generates a virtual 3D environment containing a plurality of 3D models and 3D sounds; each of the 3D models or 3D sounds being associated with a status for indicating whether or not the 3D model or 3D sound is pre-stored in the client device 21,22,23. In a preferred embodiment of the invention, for each client device, there will be one independent running instance of application. Which means, one application provides the service to one client device only, however, several applications can be executed on the same server for providing services to multiple client devices. The client device 21,22,23 connects to the server 1 via the network 4 in order to retrieve media containing at least some of the 3D models and 3D sounds generated by the application. The architecture of the system and the features thereof are illustrated in detail in FIG. 2 and its associated description.

Figure 2:
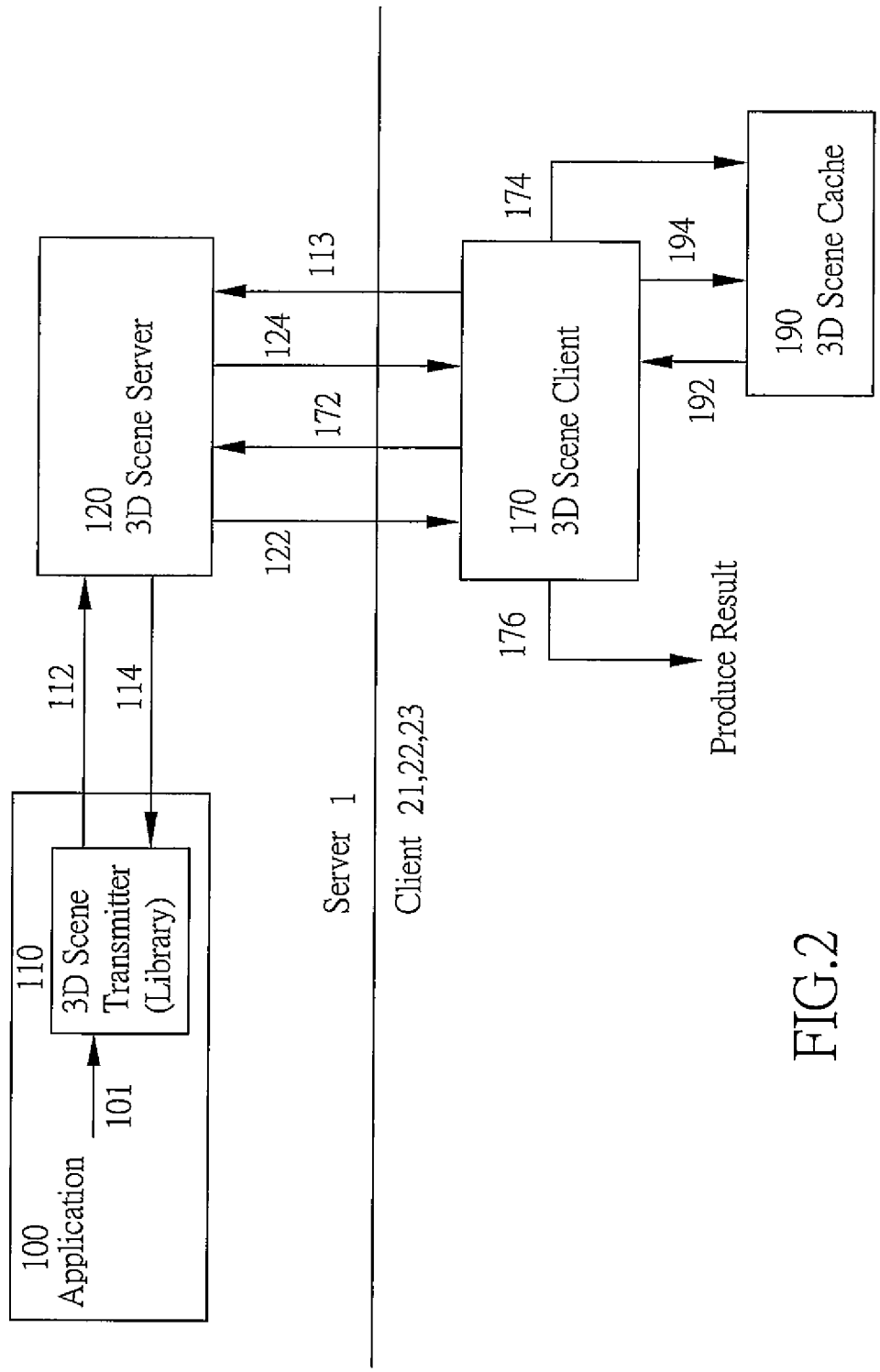
FIG. 2 is a schematic diagram showing an embodiment of a system architecture in accordance with the present invention.

FIG. 2 is a schematic diagram showing an embodiment of a system architecture in accordance with the present invention.

Application 100 is an application generating 3D graphic and 3D sound rendering result, generally a 3D game, running on server 1. The 3D Scene Transmitter 110 is a library compiled within application 100 or dynamically linked in runtime. The 3D Scene Client 170 is a program running on client device 21,22,23 for producing and then outputting the 3D graphic and 3D sound rendering result of Application 100. In this embodiment, for each client device 21,22,23, there will be one independent running instance of Application 100 and its Scene Transmitter 110.

The 3D Scene Client 170 and the 3D Scene Cache 190 make up the client side code and method for taking advantage of the client's ability to locally render 3D models, 3D sounds and scenes.

The 3D Scene Server 120 is a server program running on the server 1 with Application 100. It acts as a hub of message transfer between 3D Scene Transmitter 110 of the server 1 and 3D Scene Client 170 of the client device 21,22,23. It also acts as file download server for 3D Scene Client 170 of the client device 21,22,23 to download necessary 3D models and 3D sounds. The 3D Scene Transmitter 110 will keep a list of all 3D models and 3D sounds being used and the status of each 3D model or 3D sound. The status is used to indicate the 3D model or 3D sound being in one of the following status, such as: 1) Not Ready; 2) Loading; and 3) Ready for Client.

The main program of application 100 sends the 3D scene information to this 3D scene transmitter 110 by calling its API (path 101 in FIG. 2), including the name, position, velocity, attribute, orientation and all other necessary information of all 3D models and 3D sounds it is rendering. After 3D Scene Transmitter 110 receives such information, it will perform the following process:

Step (a): As for 3D models, sort all 3D models to be rendered from near to far relative to a virtual position such as the 3D projection plane (or user's eyes).

As for 3D sounds, sort all 3D sounds to be rendered from near to far relative to a virtual position such as the 3D projection plane (or user's eyes).

Sometimes, a 3D model A in 3D scene may wrap or overlap another 3D model B. For example, model A may be a house and model B may be a desk in the house. In such case, it may be ambiguous to tell which model is nearer. In such cases, model A and model B should be handled as one 3D model, such like a 3D model (A+B).

Prior knowledge may be used for sorting. For example, the ground may be a large and flat 3D model under other 3D objects. In general, user's eye should be above the ground, so the 3D model of the ground may be handled specially in sorting to be sure it will not be put in front of other 3D models.

Step (b): As for 3D models, from the nearest one (nearest to user's eyes), find the first 3D model "M" with status not being "ready for client". That means, the status of the first 3D model "M" is "Not Ready", and therefore we can refer the status "Not Ready" to be the status NR hereinafter for easy understanding. There may be no such 3D model if all 3D models to be displayed are marked as "Ready for Client".

As for 3D sounds, from the nearest one (nearest to user's eyes), find the first 3D sound "S" with status not being "ready for client". That means, the status of the first 3D sound "S" is "Not Ready", and therefore we can refer the status "Not Ready" to be the status NR hereinafter for easy understanding. There may be no such 3D sound if all 3D sounds to be displayed are marked as "Ready for Client".

Step (c): As for 3D models, render 3D model M and all following 3D models on server 1. (If no such 3D model M, just generate a black screen.) Then, encode the render result as one frame of 2D Video stream.

As for 3D sounds, render all 3D sounds on server 1 with status NOT being "ready for client". (If no such 3D sounds, just generate a silent sound.) Then, encode the render result as stereo sound with video frame of 2D Video stream in step (c). NOTE: 3D sounds following 3D model S are rendered only if its status is not "Ready for Client". This is different from 3D models in step (c).

Step (d): Transfer following six information ([Info 112-A], [Info 112-B] [Info 112-C], [Info 112-D], [Info 112-E] and [Info 112-F]) to 3D Scene Server 120 (path 112), and 3D Scene Server 120 will transfer it to 3D Scene Server 170 (path 122).

[Info 112-A] The status information of all 3D models before 3D model M. (There may be no such models at all.) These models are all in status "Ready for Client", which means 3D Scene Client 170 is already able to render them on client device 21,22,23. To reduce the consumption of network bandwidth, instead of transferring complete information, 3D Scene Transmitter 110 may only transfer the difference between such information of current rendering and such information of PREVIOUS rendering.

[Info 112-B] If 3D model M exists and its status is "Not Ready" for client device, change its status to "Loading" by client, and send a download request of 3D model M; if the status is already "Loading" by client, do not send any request, for the request is already sent.

[Info 112-C] The encoded video frame in Step (c).

[Info 112-D] The status information of all 3D sounds in status "ready for client". (There may be no such sounds at all.) 3D Scene Client 170 is already able to render them on client device 21,22,23. To reduce the consumption of network bandwidth, instead of transferring complete information, 3D Scene Transmitter 110 may only transfer the difference between such information of current rendering and such information of PREVIOUS rendering.

[Info 112-E] If 3D sound S exists and its status is "Not Ready" for client device, change its status to "Loading" by client, and send a download request of 3D sound S, if the status is already "Loading" by client, do not send any request, for the request is already sent.

[Info 112-F] The rendered encoded stereo sound in Step (c).

Repeat step (a)~(d) every time when main program of application 100 updates new 3D scene information to this 3D scene transmitter 110. In general, main program of application 100 update such information in each rendering cycle.

Once 3D Scene Client 170 receives above information, it will perform the following rendering process:

Step (i): Decode the video frame of [Info 112-C] and use the frame as background of following 3D model rendering. In addition, decode the stereo sound with video of [Info 112-F] and use it as background sound of following 3D sound rendering.

Step (ii): Render all 3D models, if any, described in [Info 112-A], above the video frame decoded at Step (i). To reduce network bandwidth, 3D Scene Client 170 will keep this information [Info 112-A] in memory, so for following rendering, 3D Scene Transmitter 110 may only transfer the difference of [Info 112-A] between current rendering and following rendering. In addition, render all 3D sounds, if any, described in [Info 112-D], mix with the stereo sound decoded in Step (i). To reduce network bandwidth, 3D Scene Client 170 will keep this information [Info 112-D] in memory, so for following rendering, 3D Scene Transmitter 110 may only transfer the difference of [Info 112-D] between current rendering and following rendering.

Step (iii): Output result of mixing video and local 3D model and 3D sound rendering in Step (ii) as the final produce result of an output video stream with sound (path 176).

If [Info 112-B] is provided, a 3D model M is request to be prepared by 3D Scene Client 170. The 3D Scene Client 170 will perform following process:

Step (I): Search the 3D Scene Cache 190 (path 174). The 3D Scene Cache 190 contains 3D model data files previously downloaded and stored on client device 21,22,23.

Step (II): If 3D model is available in 3D Scene Cache 190, skip to Step (V).

Step (III): If 3D model is not available in 3D Scene Cache 190, 3D Scene Client 170 will send a download request to 3D Scene Server 120. (path 172). The 3D Scene Server 120 will send the data of the 3D model to 3D Scene Client 170. (path 124).

Step (IV): Once the 3D model is downloaded completely, the 3D Scene Client 170 will store it into 3D Scene Cache 190 (path 194). So it does not to be downloaded next time when it is needed.

Step (V): The 3D Scene Client 170 will load 3D model M from 3D Scene Cache 190 (path 192).

Step (VI): Once the loading is done and 3D model M is ready to be used, 3D Scene Client 170 will send a "3D model is ready on client" message to 3D Scene Server 120 (path 113), and 3D Scene Server 120 will transfer this message to 3D Scene Transmitter 110 (path 114).

Step (VII): Once 3D Scene Transmitter 110 receives this message, it will change the status of 3D model M from "Loading" by client to "Ready for Client".

Step (VIII): On next rendering, 3D Scene Transmitter 110 will know that 3D model M is now available on client device, and will request 3D Scene Client 170 to render it, so it is no longer necessary to render this model on server 1.

If [Info 112-E] is provided, a 3D sound S is request to be prepared by 3D Scene Client 170. The 3D Scene Client 170 will perform following process: (similar as [Info 112-B] previously described)

Step (I): Search the 3D Scene Cache 190 (path 174). The 3D Scene Cache 190 contains 3D sound data files previously downloaded and stored on client device 21,22,23.

Step (II): If 3D sound is available in 3D Scene Cache 190, skip to Step (V).

Step (III): If 3D sound is not available in 3D Scene Cache 190, 3D Scene Client 170 will send a download request to 3D Scene Server 120. (path 172). The 3D Scene Server 120 will send the data of the 3D sound to 3D Scene Client 170. (path 124).

Step (IV): Once the 3D sound is downloaded completely, the 3D Scene Client 170 will store it into 3D Scene Cache 190 (path 194). So it does not to be downloaded next time when it is needed.

Step (V): The 3D Scene Client 170 will load 3D sound S from 3D Scene Cache 190 (path 192).

Step (VI): Once the loading is done and 3D sound S is ready to be used, 3D Scene Client 170 will send a "3D sound is ready on client" message to 3D Scene Server 120 (path 113), and 3D Scene Server 120 will transfer this message to 3D Scene Transmitter 110 (path 114).

Step (VII): Once 3D Scene Transmitter 110 receives this message, it will change the status of 3D sound S from "Loading" by client to "Ready for Client".

Step (VIII): On next rendering, 3D Scene Transmitter 110 will know that 3D sound S is now available on client device, and will request 3D Scene Client 170 to render it, so it is no longer necessary to render this sound on server 1.

At beginning, no 3D model and 3D sound is available on client device 21,22,23, so 3D Scene Transmitter 110 will render all 3D models and 3D sounds and encode the result as 2D video stream with stereo sound. The 3D Scene Transmitter 110 will send download request [Info 112-B] of 3D model and also download request [Info 112-E] of 3D sound from the nearest one relative to the 3D projection plane (or user's eyes). The 3D Scene Client 170 will download each 3D model or 3D sound from 3D Scene Serve 120, or load from 3D Scene Cache 190 one by one. As more and more 3D models and 3D sounds become available on 3D Scene Client 170, 3D Scene Transmitter 110 will inform 3D Scene Client 170 to render these models and sounds by itself, and reduce the amount of 3D models and 3D sounds rendered by 3D Scene Transmitter 110. Such that, there will be less and less 3D models and 3D sounds in the encoded 2D video stream, until eventually all 3D models and 3D sounds are available on 3D Scene Client 170. And then, only black screen without sound is encoded in this stage, which means the server 1 no longer needs to transmit 2D video stream to the client device 21,22,23, and thus the consumption of communication bandwidth between the server 1 and the client device 21,22,23 can be significantly reduced.

Once a new 3D model N appears in the scene, 3D Scene Transmitter 110 will (1) inform 3D Scene Client 170 only render all 3D models "in front of" this new 3D model N relative to user's eyes, (2) inform 3D Scene Client 170 to download this new 3D model N, and (3) 3D Scene Transmitter 110 will render this new 3D model N and all models behind it, encode the result as a 2D video stream with sounds, and transfer this 2D video stream with sounds to 3D Scene Client 170, so 3D Scene Client 170 can still reproduce the 3D graphic and sound rendering result of Application 100, before 3D model N is ready on client device.

Once a new 3D sound T appears in the scene, 3D Scene Transmitter 110 will (1) inform 3D Scene Client 170 to download this new 3D sound T, and (2) 3D Scene Transmitter 110 will render this new 3D sound T, encode the result as a stereo sound, and transfer with 2D video stream to 3D Scene Client 170, so 3D Scene Client 170 can still reproduce the 3D sound rendering result of Application 100, before 3D sound T is ready on client device. If this step, only the new 3D sound T is rendered, there is no need for the 3D Scene Transmitter 110 to render all other 3D sounds behind this 3D sound T; it is due to the fact that the nature of sound is different from the graphic. A graphic might obstruct another graphic behind it, but a sound won't.

Background music can be treated as a 3D sound with a predefined 3D position. To make background music being download as early as possible, set the predefined 3D position as near as possible to user's eyes.

To reduce server loading or avoid sound noise generated by unstable network data transfer, server may give up encoding all 3D sounds in video. In this case, 3D sound is only played on client device after it is downloaded and pre-stored in a client device.

As for 3D sounds, the server checking the status of the 3D sounds in order to decide which 3D sounds are to be encoded as stereo sound with 2D video stream in such a manner that, those 3D sounds which are not pre-stored in the client device will all be encoded into the video frame; wherein, when a 3D sound is encoded as stereo sound in the video frame, its volumes on left and right channels are decided by its position and velocity relative to user's ears; wherein, background music may be treated as a 3D sound with a predefined 3D position.

To reduce server loading or avoid sound noise generated by unstable network data transfer, server may give up encoding these 3D sounds in video frames. In this case, 3D sound is only played on client device when it is pre-stored in a client device.

Figure 3A:
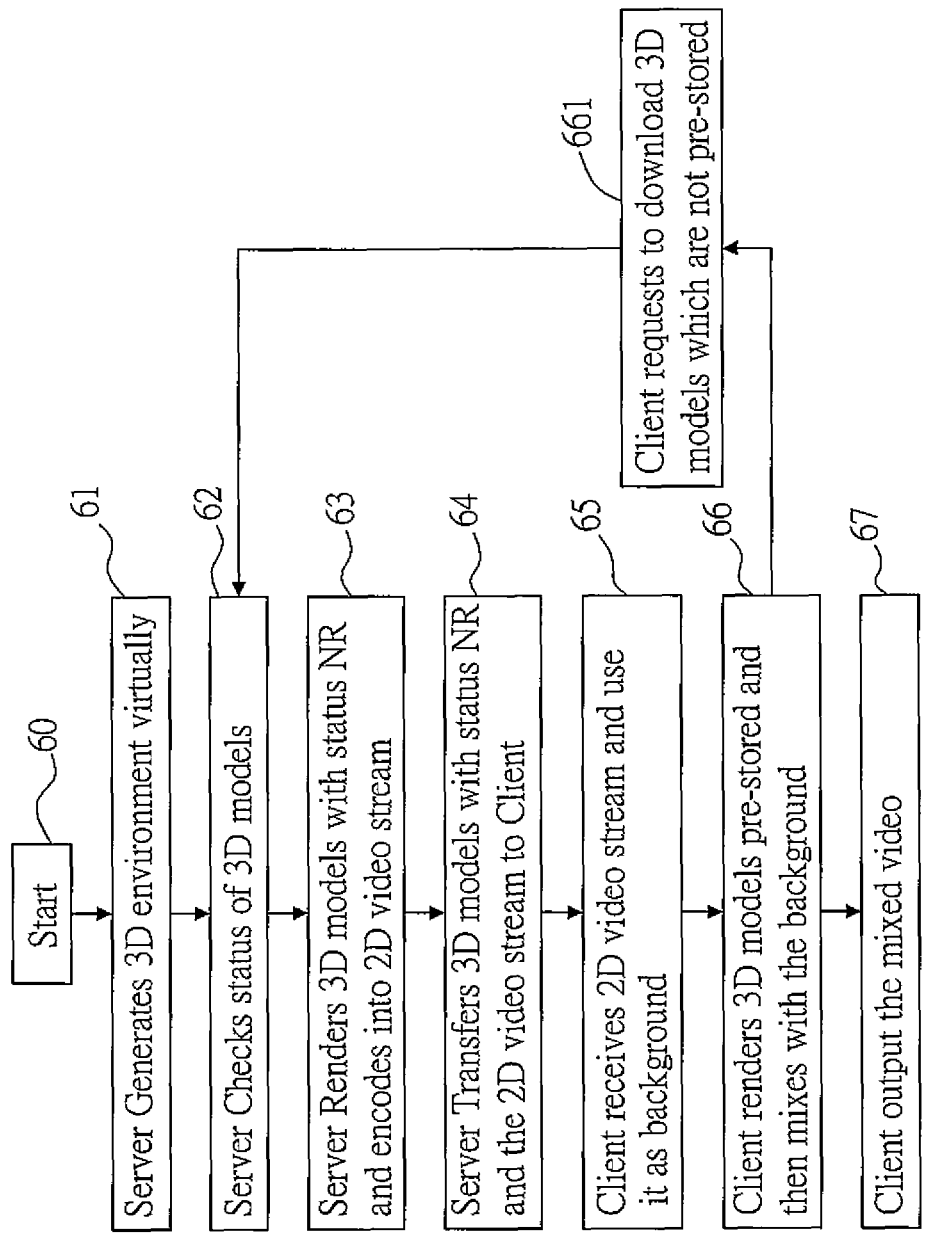
FIG. 3A is a flow chart of an embodiment of the method for delivering graphics over a network in accordance with the present invention as previously illustrated.

FIG. 3A is a flow chart of an embodiment of the method for delivering graphics over a network in accordance with the present invention as previously illustrated. When starting the method for delivering graphics over a network (Step 60), an application running on a server generates a virtual 3D environment containing a plurality of 3D models (Step 61). Each of the 3D models being associated with a status for indicating whether or not the 3D model is pre-stored in a client device.

The server then checks the statuses of the 3D models (Step 62) in order to decide which 3D models are to be encoded as a frame of a 2D video stream in such a manner that, those 3D models which are not pre-stored in the client device will all be encoded into the frame. Wherein, the statuses of the 3D models are checked by the server in an order from the one nearest to a virtual position toward another one farthest to the virtual position. During the check by following the above mentioned order, when a 3D model is first found to be not pre-stored in the client device, then this found 3D model is marked as the status NR, and then this 3D model M and all 3D models beyond this found 3D model M will also be encoded into the frame (Step 63), no matter those 3D models are pre-stored in the client device or not. When position of any 3D model is changed, or when the virtual position for sorting is changed, the above checking is performed again, and whether a 3D model is encoded in the video frame depends on newest checking result.

Step 64: after the frame of 2D video stream is encoded, the server sends the frame of 2D video stream and the 3D models that are not pre-stored in the client device (i.e., the 3D model with status NR and all 3D models beyond this 3D model M) to the client device in a predetermined order, that is, from the one nearest to the 3D projection plane (or user's eyes) to another one farthest to the 3D projection plane. Once the client device receives the frame of 2D video stream (Step 65), the client device decodes the frame received from the server and uses this frame as a background for rendering the 3D models which are pre-stored in the client device but not included within the frame, so as to generate a mixed frame (Step 66) of an output video stream with sound. When the client device receives the 3D model sent by the server, the client device stores the 3D model and then sends a message to the server in order to change the status of the 3D model for indicating the 3D model is now pre-stored in the client device. And then, the client device output the mixed frame as a part of the mixed output video stream with sound which is corresponding to the graphics of the virtual 3D environment generated by the application running on the server.

During Step 62, when a new 3D model appears in the 3D environment, then all 3D models beyond that new 3D model will be encoded into the frame, no matter those 3D models are pre-stored in the client device or not.

During Step 64, the server also sends status information of 3D models that are not encoded into the frame to the client device. The client device receives and checks the status information in such a manner that, if any 3D model contained in the status information is not pre-stored in the device receive, then the client sends a request to the server in order to download that 3D model (Step 661). Wherein, the status information includes meta data of each 3D model that is not encoded into the frame. The meta data may include a name, a position, a velocity, an orientation, an attribute and the status of each 3D model.

Figure 3B:
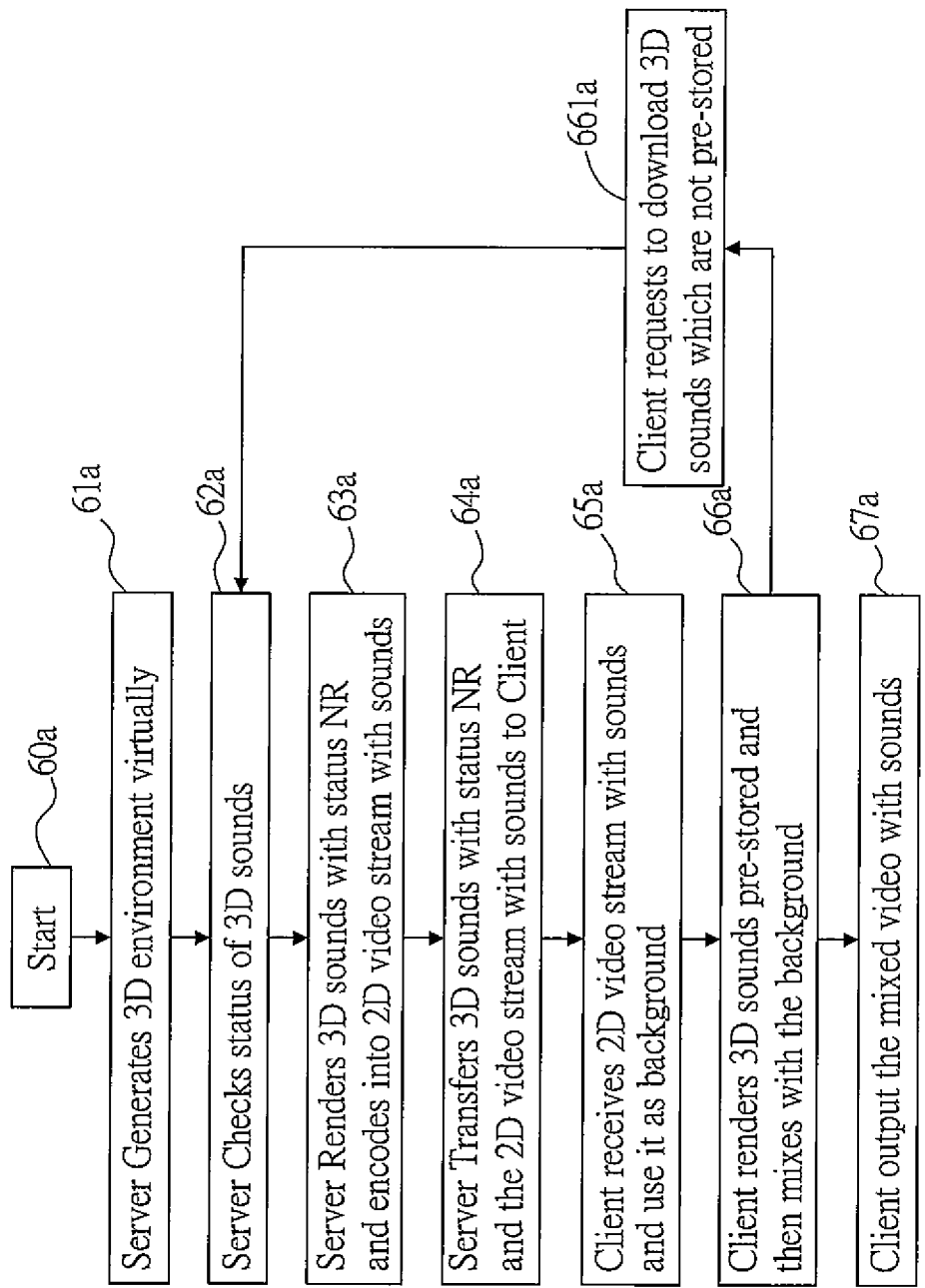
FIG. 3B is a flow chart of an embodiment of the method for delivering sounds over a network in accordance with the present invention as previously illustrated.

FIG. 3B is a flow chart of an embodiment of the method for delivering sounds over a network in accordance with the present invention as previously illustrated. When starting the method for delivering sound over a network (Step 60a), an application running on a server generates a virtual 3D environment containing a plurality of 3D sounds (Step 61a). Each of the 3D sounds being associated with a status for indicating whether or not the 3D sound is pre-stored in a client device.

The server then checks the statuses of the 3D sounds (Step 62a) in order to decide which 3D sounds are to be encoded into a 2D video stream in such a manner that, those 3D sounds which are not pre-stored in the client device will all be encoded into the 2D video stream containing the stereo sounds. Wherein, the statuses of the 3D sounds are checked by the server in an order from the one nearest to a virtual position toward another one farthest to the virtual position. During the check by following the above mentioned order, when a 3D sound is first found to be not pre-stored in the client device, then this found 3D sound is marked as the status NR.

Step 64a: after the video stream containing sounds is encoded, the server sends the frame of 2D video stream (with sounds) and the 3D sounds that are not pre-stored in the client device (i.e., the 3D sounds with status NR) to the client device in a predetermined order, that is, from the one nearest to the 3D projection plane (or user's eyes) to another one farthest to the 3D projection plane. Once the client device receives the frame of video stream (containing sounds) (Step 65*a*), the client device decodes the audio (i.e., sounds) contained in the video stream and uses this audio as a background audio for rendering the 3D sounds which are pre-stored in the client device but not included within the frame of video stream, so as to generate a mixed audio (Step 66*a*). When the client device receives the 3D sound sent by the server, the client device stores the 3D sound and then sends a message to the server in order to change the status of the 3D sound for indicating the 3D sound is now pre-stored in the client device. And then, the client device output the mixed audio as a part of the mixed video stream which is corresponding to the audio of the virtual 3D environment generated by the application running on the server.

During Step 62*a*, when a new 3D sound appears in the 3D environment, this new 3D sound will be encoded into the frames of 2D video stream with sound. However, whether other 3D sounds are rendered or not, is not affected by this new 3D model. This is different from 3D models.

During Step 64*a*, the server also sends status information of 3D sounds that are not encoded into the frame to the client device. The client device receives and checks the status information in such a manner that, if any 3D sound contained in the status information is not pre-stored in the device receive, then the client sends a request to the server in order to download that 3D sound (Step 661*a*). Wherein, the status information includes meta data of each 3D sound that is not encoded into the frame. The meta data may include a name, a position, a velocity, an orientation, an attribute and the status of each 3D sound.

Figure 4A:
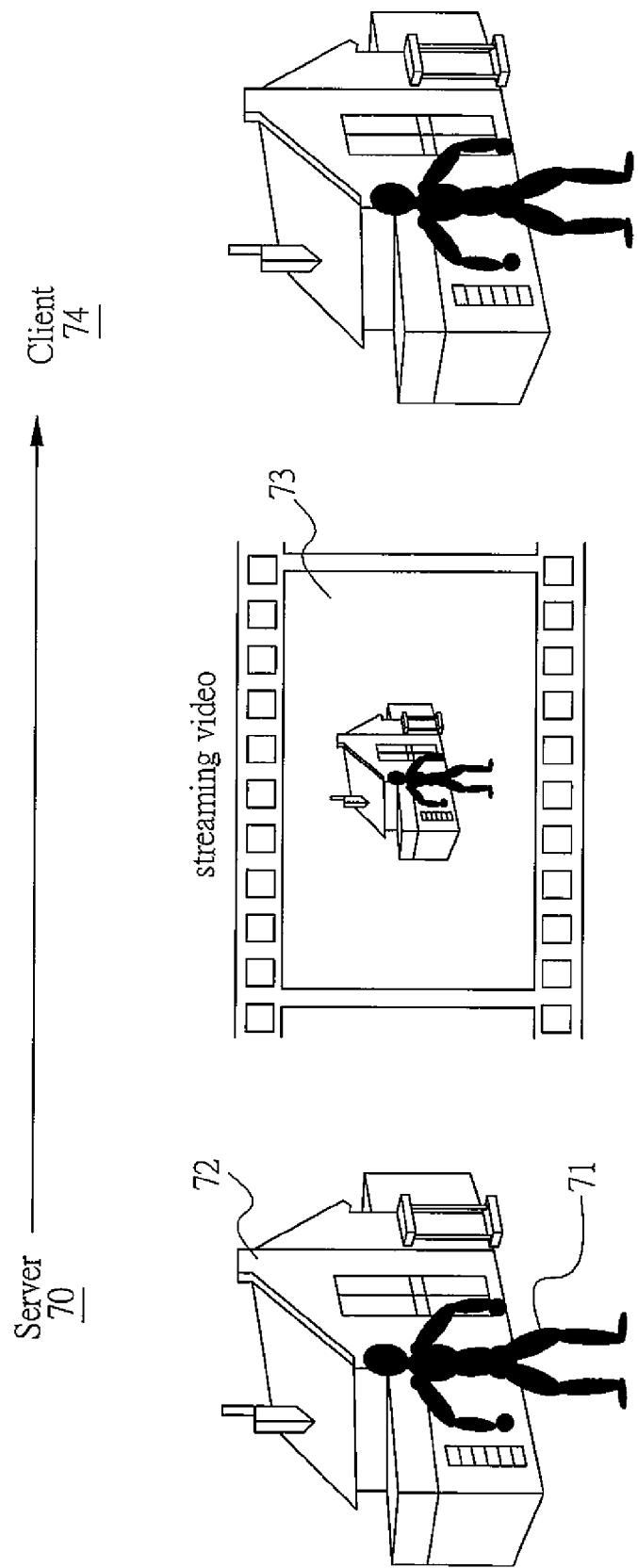
Figure 4C:
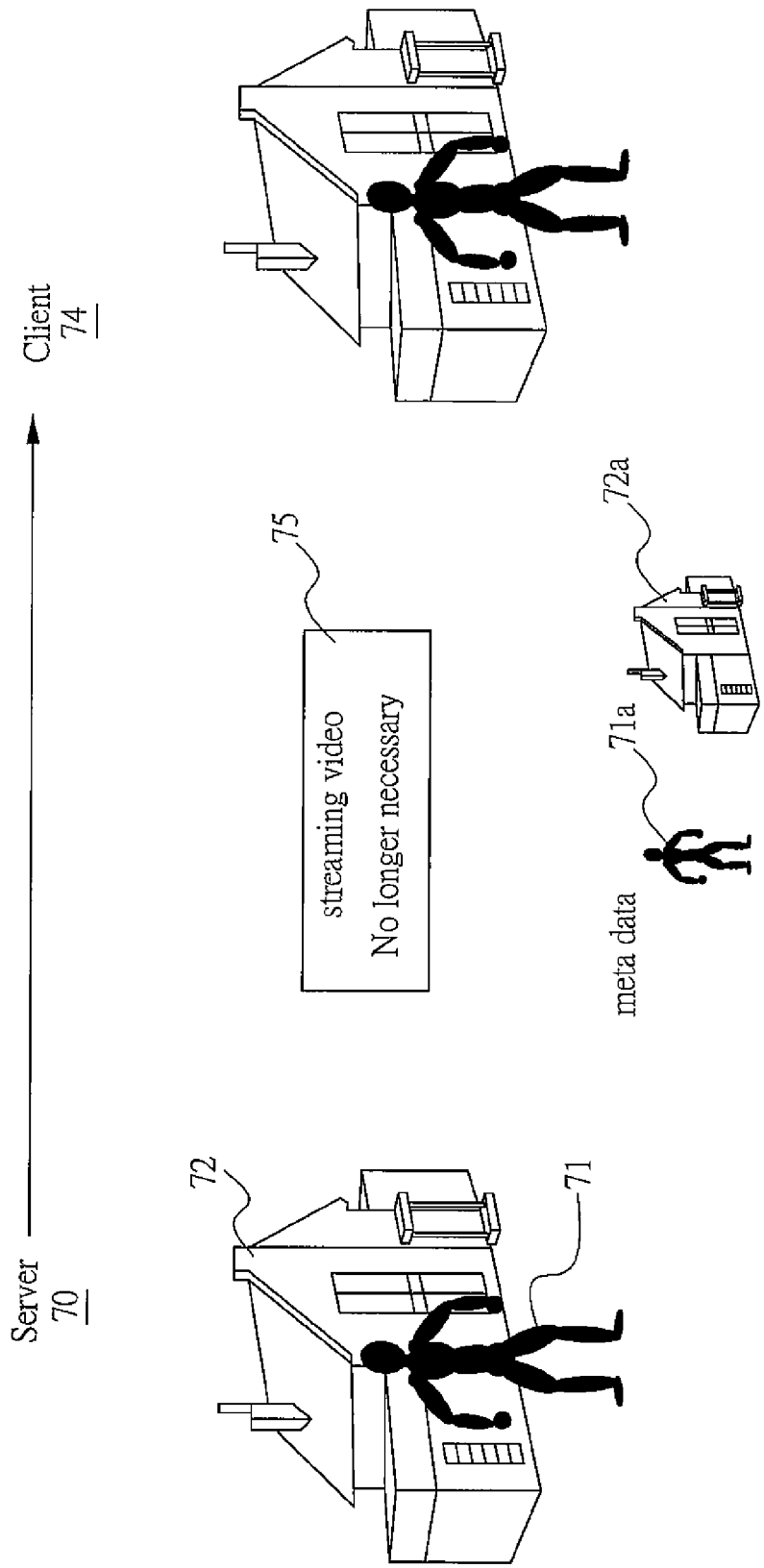

Please refer to FIGS. 4A, 4B and 4C, which schematically show an example how the video streaming and 3D models are transmitted in accordance with the method of the present invention.

As shown in FIG. 4A, at the beginning when the client device 74 logged in the application run on the server 70, there is no 3D model pre-stored in the client device. Therefore, the server renders all of the 3D models (including a person 71 stand in front of a house 72) which should be shown on the client device's screen, encodes the result of rendering as a frame 73 of 2D video stream, and then transfers the frame 73 to the client device 74. In this stage, the frame 73 contains both the person 71 and the house 72, while the client device 74 can just output this frame 73 without the need to render other objects.

And then, as shown in FIG. 4B, the server 70 start sending the 3D models to the client device, starting from the 3D model nearest to the 3D projection plane of the client device's screen. In this embodiment, the person 71 is near to the 3D projection plane (or user's eye) in comparison with the house 72, and thus the 3D model of the person 71 is firstly transmitted to the client device 74. Once the 3D model of the person 71 is transmitted to and stored in the client device 74, the client device 74 send a message to the server 70 to inform that the 3D model of the person 71 is now "pre-stored" in the client device 74. Therefore, the server 70 renders the house 72, encodes the result of rendering as a frame 73*a* of 2D video stream, and then transfers the frame 73*a* together with the meta data of the person 71*a* to the client device 74. The client device 74 then will render the person itself by using the meta data and combine the rendering of the person with the frame 73*a* (including the house) to get the same result of output. This procedure will repeat, e.g., the server 70 transmits the 3D models to the client device 74 one by one, until all of the 3D models which should be shown on the client device's screen are transmitted and pre-stored in the client device 74.

As shown in FIG. 4A, once the client device 74 has all the 3D models, including the 3D models of the person and the house, server no longer needs to do the rendering nor send the frame of video streaming (item 75). The server only needs to transfer the meta data of the 3D models, including the meta data of both the person 71*a* and the house 72*a*, to the client device 74. The client will then perform all of the rendering in order to get the same result of output.

Figure 6A:
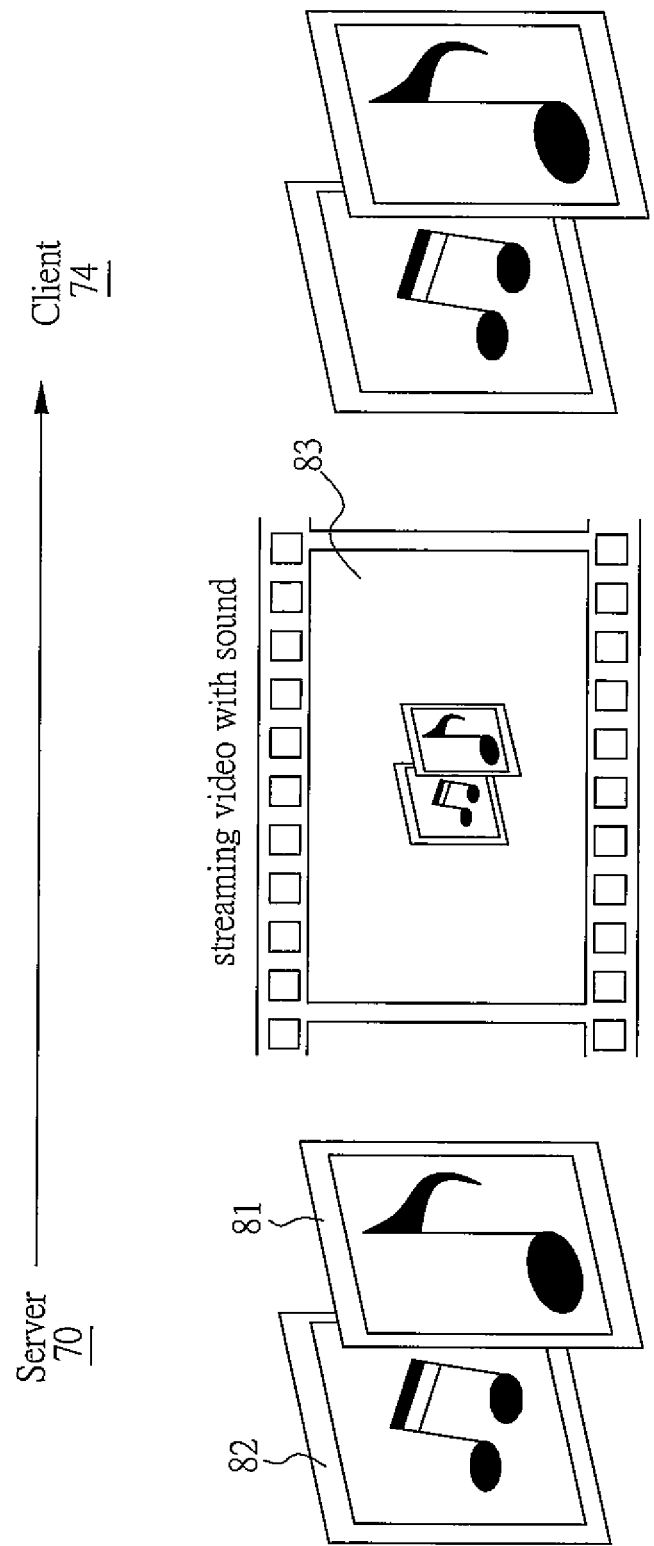
FIGS. 6A, 6B and 6C which schematically show an example how the video streaming with sounds and 3D sounds are transmitted in accordance with the method of the present invention.
Figure 6B:
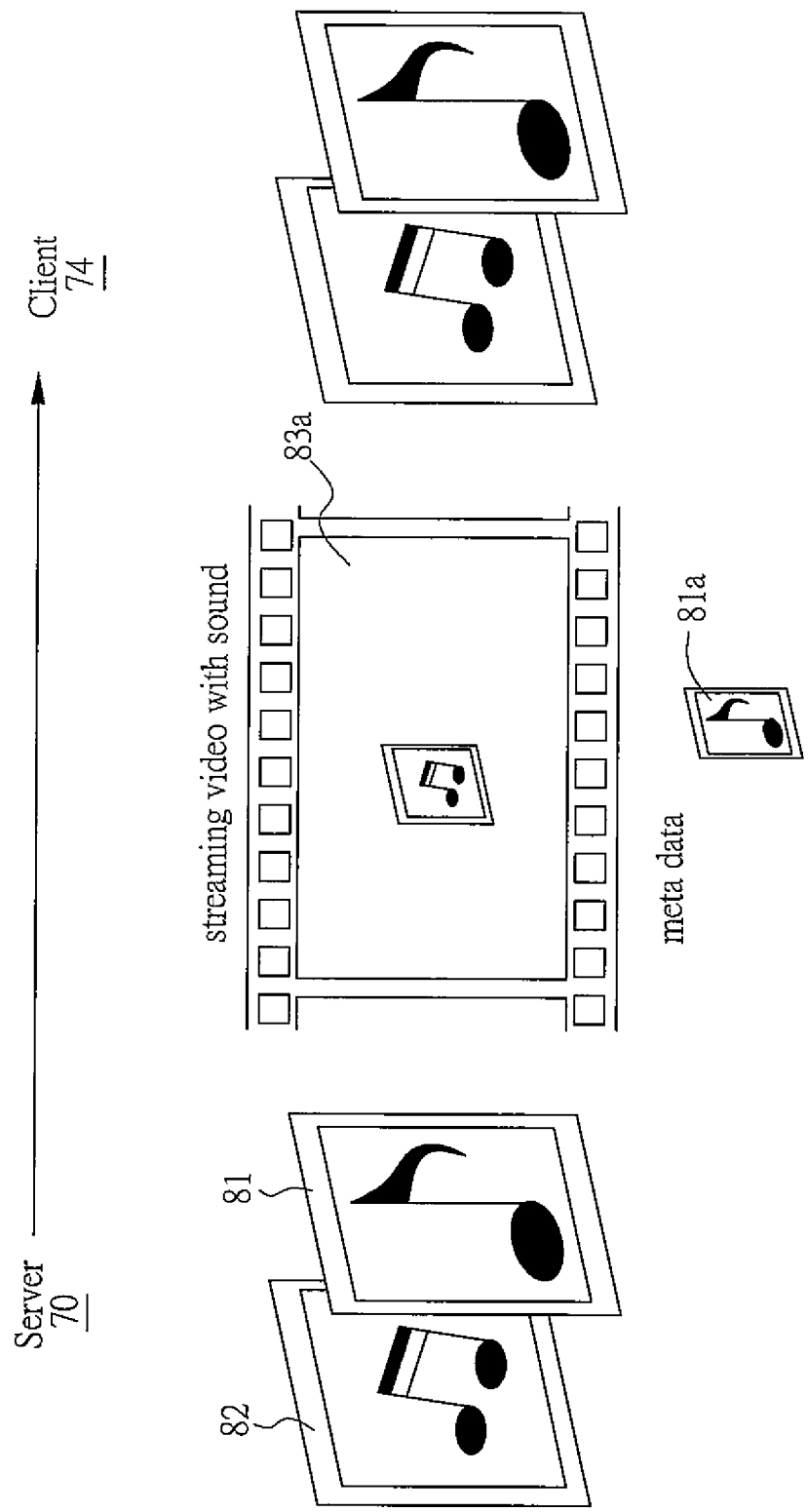
Figure 6C:
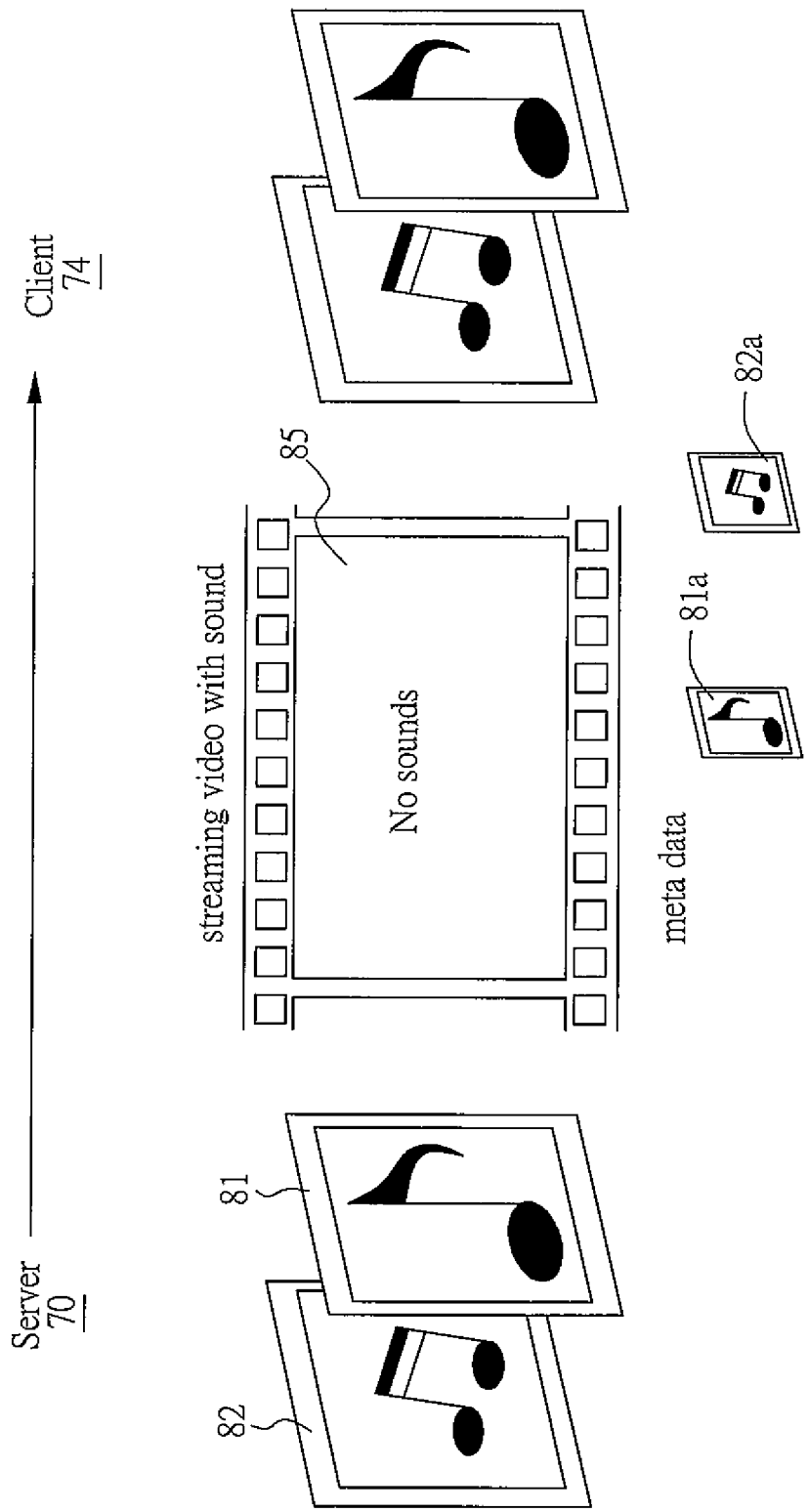

Please refer to FIGS. 6A, 6B and 6C, which schematically show an example how the video streaming with sounds and 3D sounds are transmitted in accordance with the method of the present invention.

As shown in FIG. 6A, at the beginning when the client device 74 logged in the application run on the server 70, there is no 3D sound pre-stored in the client device. Therefore, the server renders all of the 3D sounds (including a sound 81 in front of a sound 82) which should be played on the client device's speaker, encodes the result of rendering as a frame 83 of video stream with sounds, and then transfers the frame 83 of video stream with sounds to the client device 74. In this stage, the frame 83 of video stream with sounds contains both sound 81 and sound 82, while the client device 74 can just output this frame 83 of video stream with sounds without the need to render other objects.

And then, as shown in FIG. 6B, the server 70 start sending the 3D sounds to the client device, starting from the 3D sound nearest to the 3D projection plane of the client device's screen. In this embodiment, the sound 81 is near to the 3D projection plane (or user's eye) in comparison with the sound 82, and thus the 3D sound 81 is firstly transmitted to the client device 74. Once the 3D sound 81 is transmitted to and stored in the client device 74, the client device 74 send a message to the server 70 to inform that the 3D sound 81 is now "pre-stored" in the client device 74. Therefore, the server 70 renders the sound 82, encodes the result of rendering as a frame 83*a* of video streaming with sounds, and then transfers the frame 83*a* of video streaming with sounds together with the meta data 81*a* of the sound 81 to the client device 74. The client device 74 then will render the sound 81 itself by using the meta data and combine the rendering of the sound 81 with the frame 83*a* (including the sound 82) to get the same result of output. This procedure will repeat, e.g., the server 70 transmits the 3D sounds to the client device 74 one by one, until all of the 3D sounds which should be played on the client device's speaker are transmitted and pre-stored in the client device 74.

As shown in FIG. 6C, once the client device 74 has all the 3D sounds, including the 3D sounds 71 and 72, server no longer needs to do the rendering and thus the frame of video streaming will contain only graphics but no sound at all (item 85). The server only needs to transfer the meta data of the 3D sounds, including the meta data 81*a* of the sound 81, and meta data 82*a* of the sound 82, to the client device 74. The client will then perform all of the rendering in order to get the same result of output.

Figure 5A:
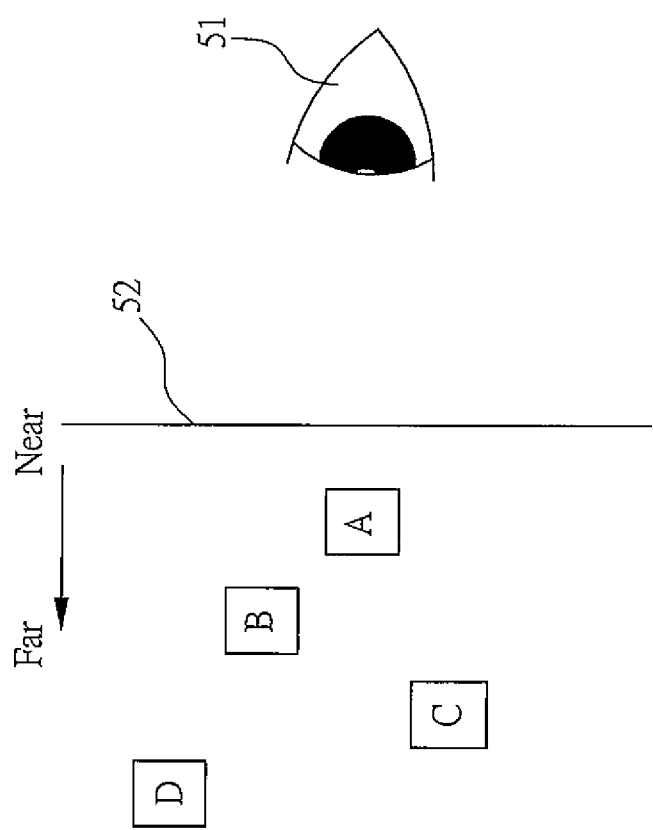
FIGS. 5A, 5B and 5C schematically show an example how to decide what 3D models are to be encoded to the frame in accordance with the method of the present invention.
Figure 5B:
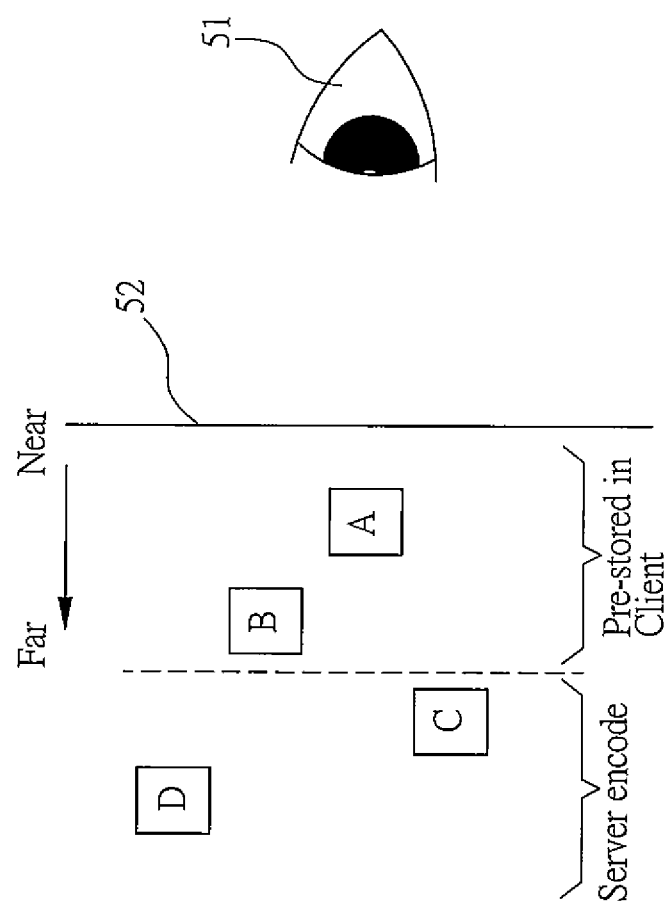
Figure 5C:
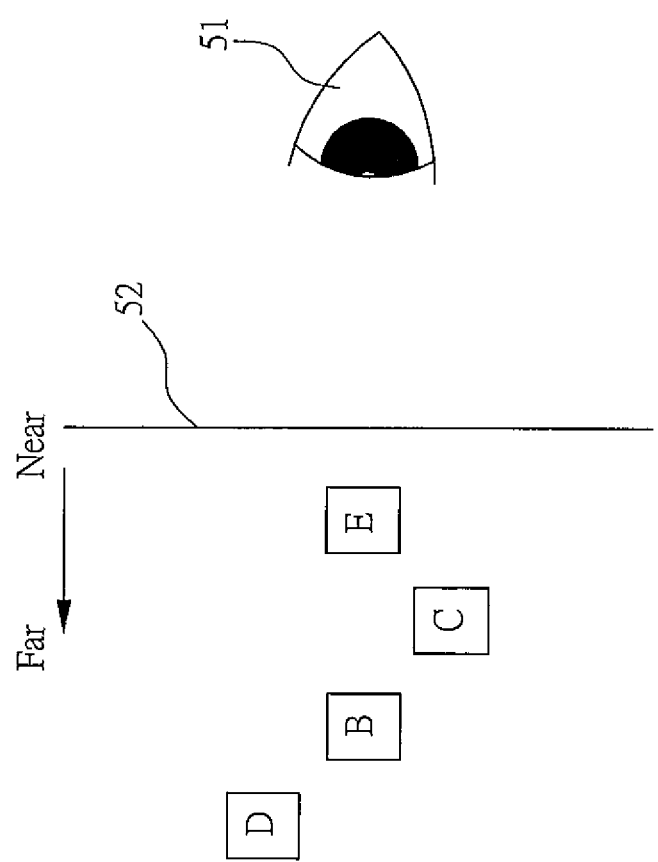

Please refer to FIGS. 5A, 5B and 5C, which schematically show an example how to decide what 3D models are to be encoded to the frame in accordance with the method of the present invention.

In the present invention, the server sorts all 3D models to be rendered from near to far relative to a virtual position such as the 3D projection plane 52 of the client device's screen or the user's eyes 51. As shown in FIG. 5A, four objects A, B, C and D are required to be shown on the client device's screen, where the object A is nearest to the projection plane 52, and then followed by object B, object C and object D in sequence. At the beginning when the client device logged in the application run on the server, there is no 3D model pre-stored in the client device. Therefore, the server renders all of the objects A, B, C and D, encodes the result of rendering as a frame of 2D video stream, and then transfers the frame to the client device. In the mean time, the server also starts transmitting the 3D models of these objects A, B, C and D in the same order previously described, that is, from near to far relative to the 3D projection plane 52 or the user's eye 51. Therefore, the 3D model of object A will first be transmitted, and then object B, and then object C, and then object D, until all 3D models to be shown are finally stored in the client device.

As shown in FIG. 5B, after the 3D models of both the objects A and B are pre-stored in the client device. The server will find that the object C is the first object which is not pre-stored in the client device when the server is checking the statuses of the 3D models in above mentioned near-to-far order. Thereby, the server will render the object C and all other objects behind the object C (e.g., object D), no matter if the 3D model of object D is pre-stored in the client device or not. The 3D models of both objects A and B will not be rendered by the server in this stage, not only because they are pre-stored in the client device, but also because they are located in front of the object C.

As shown in FIG. 5C, when a new object E is shown in the virtual 3D environment created by the application, all objects (including the object E itself) behind this newly presented object E will be rendered by the server, regardless whether that object is pre-stored in the client device or not. For example, it can be seen from FIG. 5C that, the new object E is relatively near to the 3D projection plane 52 in comparison with the objects C, B and D. Although the 3D model of object B has been already pre-stored in the client side, however, because the object B is located behind the new object E, thus all of the objects E, C, B and D are required to be rendered by the server, due to the fact that the object B might be partially or totally covered by other objects in front of the object B.

Figure 7A:
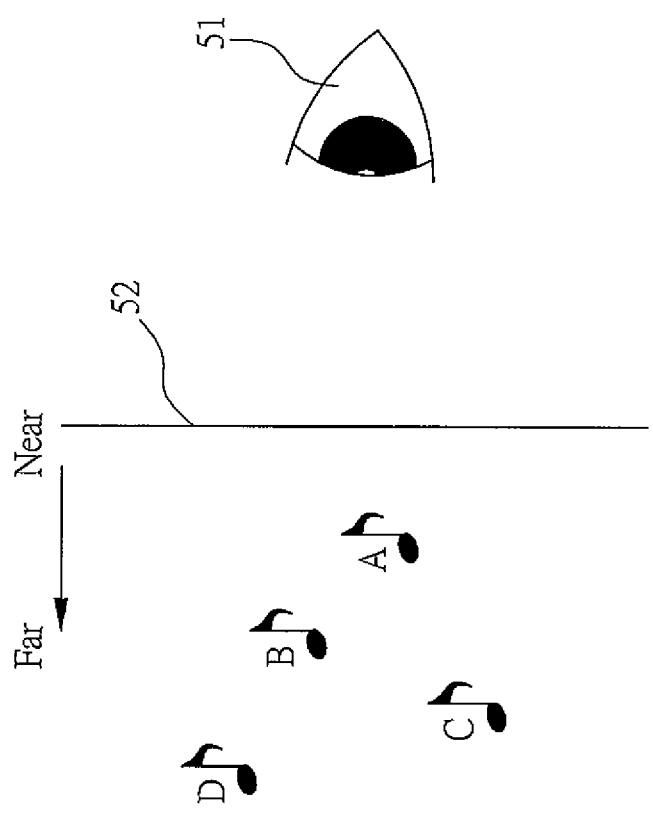
FIGS. 7A, 7B and 7C schematically show an example how to decide what 3D sounds are to be encoded to the video frame with sounds in accordance with the method of the present invention.
Figure 7B:
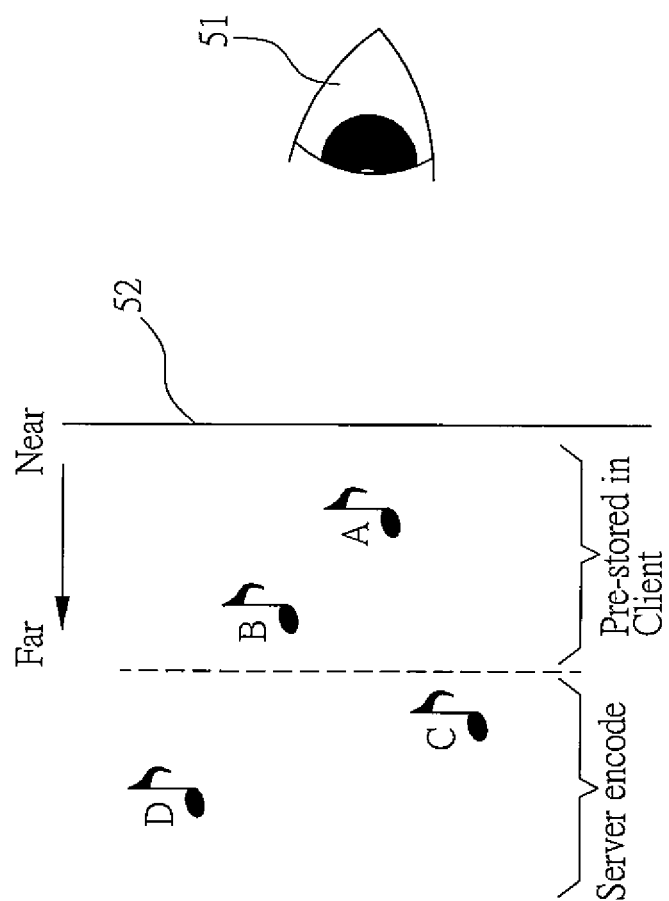
Figure 7C:
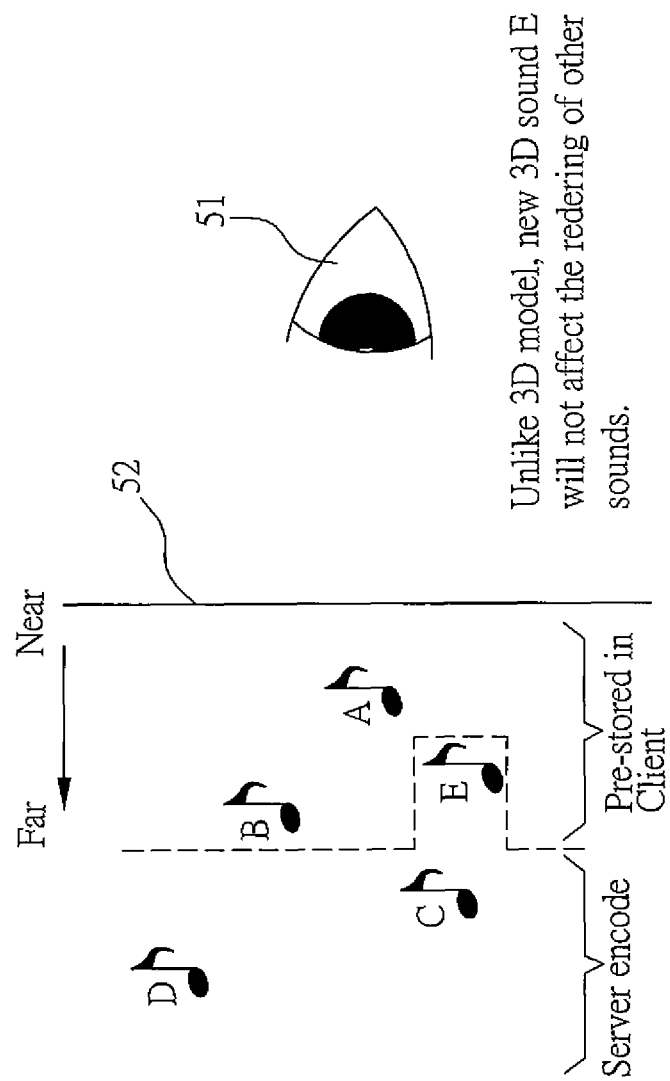

Please refer to FIGS. 7A, 7B and 7C, which schematically show an example how to decide what 3D sounds are to be encoded to the video frame with sounds in accordance with the method of the present invention.

In the present invention, the server sorts all 3D sounds to be rendered from near to far relative to a virtual position such as the 3D projection plane 52 of the client device's screen or the user's eyes 51. As shown in FIG. 5D, four 3D sounds A, B, C and D are required to be played on the client device's speaker, where the sound A is nearest to the projection plane 52, and then followed by sound B, sound C and sound D in sequence. At the beginning when the client device logged in the application run on the server, there is no 3D sound pre-stored in the client device. Therefore, the server renders all of the sounds A, B, C and D, encodes the result of rendering as a frame of video stream containing sounds, and then transfers the frame to the client device. In the mean time, the server also starts transmitting the data of these sounds A, B, C and D in the same order previously described, that is, from near to far relative to the 3D projection plane 52 or the user's eye 51. Therefore, the 3D sound A will first be transmitted, and then sound B, and then sound C, and then sound D, until all 3D sounds to be shown are finally stored in the client device.

As shown in FIG. 7B, after the 3D sounds A and B are pre-stored in the client device. The server will find that the sound C is the first sound which is not pre-stored in the client device when the server is checking the statuses of the 3D sounds in above mentioned near-to-far order. Thereby, the server will render the sound C and other sounds (ex: sound D) not pre-stored in the client device. The 3D sounds A and B will not be rendered by the server in this stage because they are already pre-stored in the client device.

As shown in FIG. 7C, when a new sound E is added to the virtual 3D environment created by the application, it will be rendered by server, but it will not affect renderings of other sounds. This is different from 3D models in FIG. 5C. For example, it can be seen from FIG. 7C that, the new sound E is relatively near to the 3D projection plane 52 in comparison with the sounds C, B and D. Unlike 3D models in FIG. 5C, sounds pre-stored in client device such as A and B are still rendered by client, and sounds not pre-stored in client device such as E, C and D are still rendered by server.

While the present invention has been particularly shown and described with reference to a preferred embodiment, it will be understood by those skilled in the art that various changes in form and detail may be without departing from the spirit and scope of the present invention.

What is claimed is:

1. A method for delivering media over a network, said media comprising a plurality of graphics and sounds, said method comprising the following steps:

Step (A): running an application on a server for generating a virtual 3D environment containing a plurality of 3D models and 3D sounds; each of the 3D models and 3D sounds being associated with a status for indicating whether or not the 3D model or 3D sound is pre-stored in a client device;

Step (B): the server checking the statuses of the 3D models and 3D sounds in order to decide which 3D models or 3D sounds are to be encoded as a frame of a 2D video stream with sound in such a manner that, those 3D models and 3D sounds which are not pre-stored in the client device will all be encoded into the frame;

Step (C): the server sending at least the frame of the 2D video stream with sound to the client device via a network; wherein in Step (C), the server also sends the 3D models and 3D sounds that are not pre-stored in the client device to the client device in a predetermined order; when the client device receives the 3D model or 3D sound sent by the server, the client device stores the 3D model or 3D sound and then sends a message to the server in order to change the status of the 3D model or 3D sound for indicating the 3D model or 3D sound is now pre-stored in the client device; and Step (D): the client device decoding the frame received from the server and using said frame as a background for rendering the 3D models and 3D sounds which are pre-stored in the client device but not included within the frame, so as to generate a mixed frame of an output video stream with sound.

2. The method for delivering media over a network of claim 1, wherein in Step (B), the statuses of the 3D models are checked by the server in an order from the one nearest to a virtual position toward another one farthest to the virtual position; during the check by following said order, when a 3D model is first found to be not pre-stored in the client device, then all 3D models beyond that found 3D model will also be encoded into the frame, no matter those 3D models are pre-stored in the client device or not; wherein in Step (B), the statuses of the 3D sounds are checked by the server in an order from the one nearest to a virtual position toward another one farthest to the virtual position; during the check by following said order, when any 3D sound is found to be not pre-stored in the client device, then the 3D sound will be encoded into the frame of 2D video stream with sound.

3. The method for delivering media over a network of claim 2, wherein when a new 3D model appears in the 3D environment, then all 3D models beyond that new 3D model will be encoded into the frame, no matter those 3D models are pre-stored in the client device or not.

4. The method for delivering media over a network of claim 2, wherein said virtual position is a 3D projection plane.

5. The method for delivering media over a network of claim 1, wherein in Step (C), said predetermined order for the server to send the 3D models and 3D sounds that are not pre-stored in the client device to the client device is from the one nearest to the virtual position toward another one farthest to the virtual position.

6. The method for delivering media over a network of claim 1, wherein in Step (C), the server also sends a status information of 3D models and 3D sounds that are not encoded into the frame to the client device; the client device receives and checks the status information in such a manner that, if any 3D model or 3D sound contained in the status information is not pre-stored in the device receive, then the client sends a request to the server in order to download that 3D model or 3D sound.

7. The method for delivering media over a network of claim 6, wherein the status information includes meta data of each 3D model and 3D sound that is not encoded into the frame of 2D video stream with sound, said meta data of each 3D model include a name, a position, a velocity and an attribute of each 3D model.

8. A system for delivering media over a network, comprising:
a server for running an application to generate a virtual 3D environment containing a plurality of 3D models and 3D sounds; each of the 3D models and 3D sounds being associated with a status for indicating whether or not the 3D model or 3D sound is pre-stored in a client device; and
the client device for connecting to the server via a network in order to retrieve media containing at least some of the 3D models and 3D sounds generated by the application;
wherein, said media comprises a plurality of graphics and sounds which are transmitted by the following steps:
Step (B): the server checking the statuses of the 3D models and 3D sounds in order to decide which 3D models and 3D sounds are to be encoded as a frame of a 2D video stream with sound in such a manner that, those 3D models and 3D sounds which are not pre-stored in the client device will all be encoded into the frame;
Step (C): the server sending at least the frame of the 2D video stream with sound to the client device via the network; wherein in Step (C), the server also sends the 3D models and 3D sounds that are not pre-stored in the client device to the client device in a predetermined order; when the client device receives the 3D model or 3D sound sent by the server, the client device stores the 3D model or 3D sound and then sends a message to the server in order to change the status of the 3D model or 3D sound for indicating the 3D model or 3D sound is now pre-stored in the client device;
Step (D): the client device decoding the frame received from the server and using said frame as a background for rendering the 3D models and 3D sounds which are pre-stored in the client device but not included within the frame, so as to generate a mixed frame of an output video stream with sound; and
Step (E): the client device outputting the mixed frame as a frame of the output video stream with sound.

9. The system for delivering media over a network of claim 8, wherein in Step (B), the statuses of the 3D models are checked by the server in an order from the one nearest to a virtual position toward another one farthest to the virtual position; during the check by following said order, when a 3D model is first found to be not pre-stored in the client device, then all 3D models beyond that found 3D model will also be encoded into the frame, no matter those 3D models are pre-stored in the client device or not; wherein in Step (B), the statuses of the 3D sounds are checked by the server in an order from the one nearest to a virtual position toward another one farthest to the virtual position; during the check by following said order, when any 3D sound is found to be not pre-stored in the client device, then the 3D model will be encoded into the frame of 2D video stream with sound.

10. The system for delivering media over a network of claim 9, wherein when a new 3D model appears in the 3D environment, then all 3D models beyond that new 3D model will be encoded into the frame, no matter those 3D models are pre-stored in the client device or not.

11. The system for delivering media over a network of claim 8, wherein in Step (C), said predetermined order for the server to send the 3D models and 3D sounds that are not pre-stored in the client device to the client device is from the one nearest to the virtual position toward another one farthest to the virtual position.

12. The system for delivering media over a network of claim 8, wherein in Step (C), the server also sends a status information of 3D models and 3D sounds that are not encoded into the frame to the client device; the client device receives and checks the status information in such a manner that, if any 3D model or 3D sound contained in the status information is not pre-stored in the device receive, then the client sends a request to the server in order to download that 3D model or 3D sound.

13. The system for delivering media over a network of claim 12, wherein the status information includes meta data of each 3D model and 3D sound that is not encoded into the frame of 2D video stream with sound, said meta data of each 3D model include a name, a position, a velocity and an attribute of each 3D model or 3D sound.

14. The system for delivering media over a network of claim 8, wherein the server further comprises:
a 3D Scene Transmitter which is a library either compiled within the application or dynamically linked in runtime with the application; wherein the 3D Scene Transmitter keeps a list of all 3D models and 3D sounds and the status of each 3D model or 3D sound; wherein said status is used to indicate the 3D model or 3D sound being in one of the following status: "Not Ready", "Loading" and "Ready for Client"; and
a 3D Scene Server which is a server program running on server with the application; wherein, the 3D Scene Server acts as a hub of message transfer between the 3D Scene Transmitter and the client device, the 3D Scene Server also acts as a file download server for the client device to download necessary 3D models and 3D sounds from the server.

15. The system for delivering media over a network of claim 14, wherein the client device further comprises:
a 3D Scene Client which is a program running on the client device for producing the output video stream and for communicating with the server via the network; and
a 3D Scene Cache for storing at least the 3D models and 3D sounds previously downloaded from the server.

16. A method for delivering media over a network, said media comprising a plurality of graphics and sounds, said method comprising the following steps:

Step (A): running an application on a server for generating a virtual 3D environment containing a plurality of 3D models and 3D sounds; each of the 3D sounds being associated with a status for indicating whether or not the 3D sound is pre-stored in a client device;

Step (B): the server checking the statuses of the 3D sounds in order to decide which 3D sounds are to be encoded as a 2D video stream with sound in such a manner that, those 3D sounds which are not pre-stored in the client device will all be encoded into the 2D video stream with sound;

Step (C): the server sending at least the 2D video stream with sound to the client device via a network; wherein in Step (C), the server also sends the 3D sounds that are not pre-stored in the client device to the client device in a predetermined order; when the client device receives the 3D sound sent by the server, the client device stores the 3D sound and then sends a message to the server in order to change the status of the 3D sound for indicating the 3D sound is now pre-stored in the client device; and Step (D): the client device decoding the 2D video stream with sound received from the server and using said 2D video stream with sound as a background for rendering the 3D sounds which are pre-stored in the client device but not included within the 2D video stream with sound, so as to generate a mixed output video stream with sound.

17. The method for delivering media over a network of claim 1, wherein:

in Step (A), each of the 3D models is also associated with a status for indicating whether or not the 3D model is pre-stored in the client device;

in Step (B), the server checks the statuses of the 3D models in order to decide which 3D models are to be encoded into a frame of said 2D video stream with sound in such a manner that, those 3D models which are not pre-stored in the client device will all be encoded into the frame of said 2D video stream;

in Step (B), the statuses of the 3D models are checked by the server in an order from the one nearest to a virtual position toward another one farthest to the virtual position; during the check by following said order, when a 3D model is first found to be not pre-stored in the client device, then all 3D models beyond that found 3D model will also be encoded into the frame of said 2D video stream, no matter those 3D models are pre-stored in the client device or not;

in Step (B), the statuses of the 3D sounds are checked by the server in an order from the one nearest to a virtual position toward another one farthest to the virtual position; during the check by following said order, when any 3D sound is found to be not pre-stored in the client device, then the 3D model will be encoded into the 2D video stream with sound;

in Step (C), the server also sends the 3D models that are not pre-stored in the client device to the client device in the predetermined order from the one nearest to the virtual position toward another one farthest to the virtual position; when the client device receives the 3D model sent by the server, the client device stores the 3D model and then sends a message to the server in order to change the status of the 3D model for indicating the 3D model is now pre-stored in the client device.

18. The method for delivering media over a network of claim 17, wherein when a new 3D model appears in the 3D environment, then all 3D models beyond that new 3D model will be encoded into the frame, no matter those 3D models are pre-stored in the client device or not; wherein said virtual position is a 3D projection plane.

19. The method for delivering media over a network of claim 17, wherein in Step (C), the server also sends a status information of 3D models and 3D sounds that are not encoded into the frame to the client device; the client device receives and checks the status information in such a manner that, if any 3D model or 3D sound contained in the status information is not pre-stored in the device receive, then the client sends a request to the server in order to download that 3D model or 3D sound.

20. The method of claim 19, wherein the status information includes meta data of each 3D model and 3D sound that is not encoded into the frame of 2D video stream with sound, said meta data include a name, a position, a velocity and an attribute.

* * * * *